Nov. 17, 1953   J. A. BOMBARDIER   2,659,101
VULCANIZING APPARATUS
Filed May 19, 1952   3 Sheets-Sheet 1

Inventor:
Joseph Armand Bombardier
By Alter Fournier
Attorney

Nov. 17, 1953  J. A. BOMBARDIER  2,659,101
VULCANIZING APPARATUS
Filed May 19, 1952  3 Sheets-Sheet 2
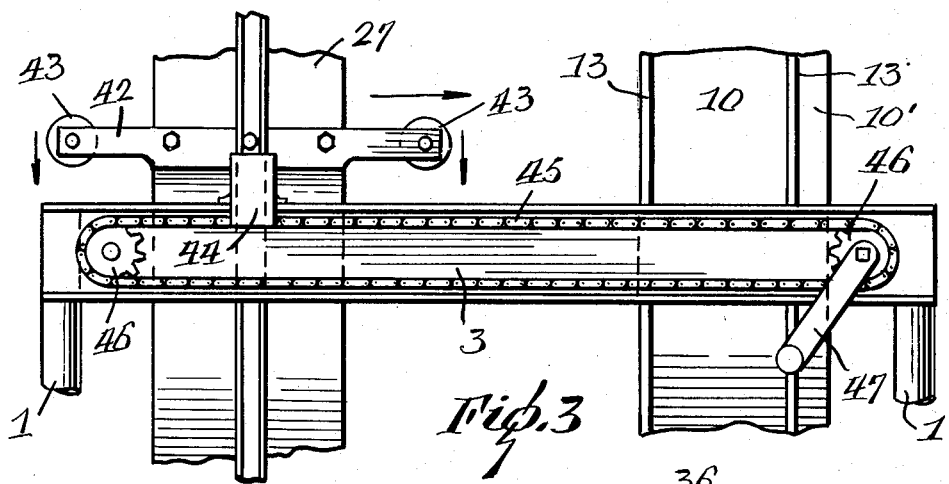
Fig. 3
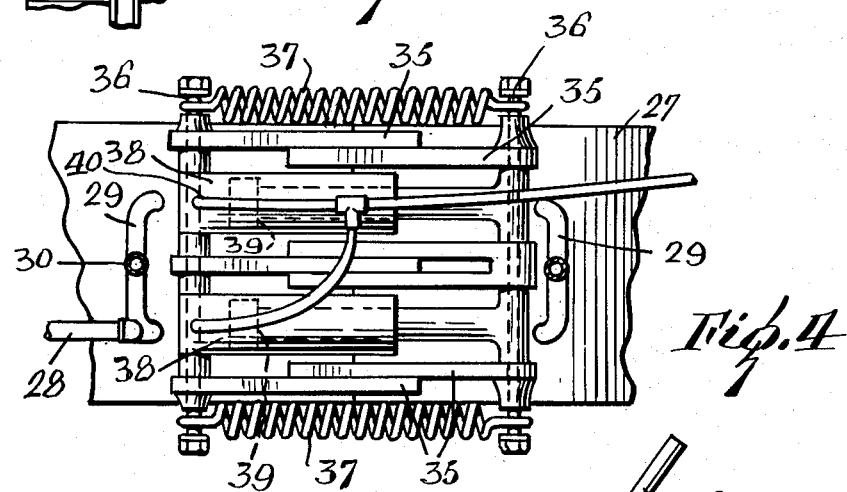
Fig. 4
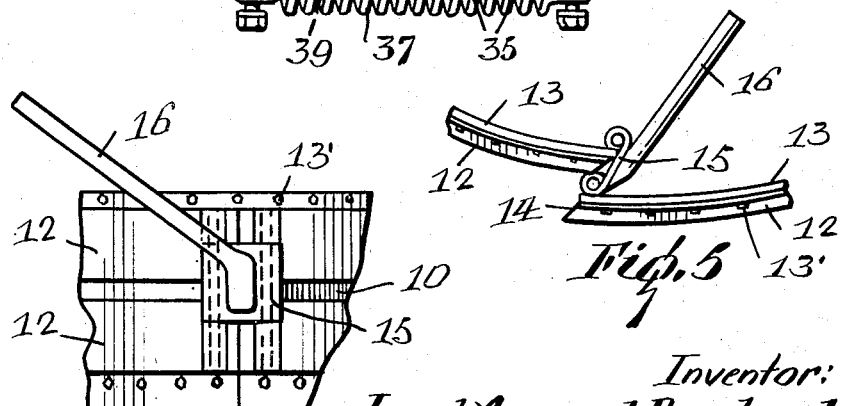
Fig. 5
Fig. 6
Inventor:
Joseph Armand Bombardier
By 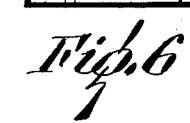
Attorney Nov. 17, 1953        J. A. BOMBARDIER         2,659,101
                     VULCANIZING APPARATUS
Filed May 19, 1952                          3 Sheets-Sheet 3
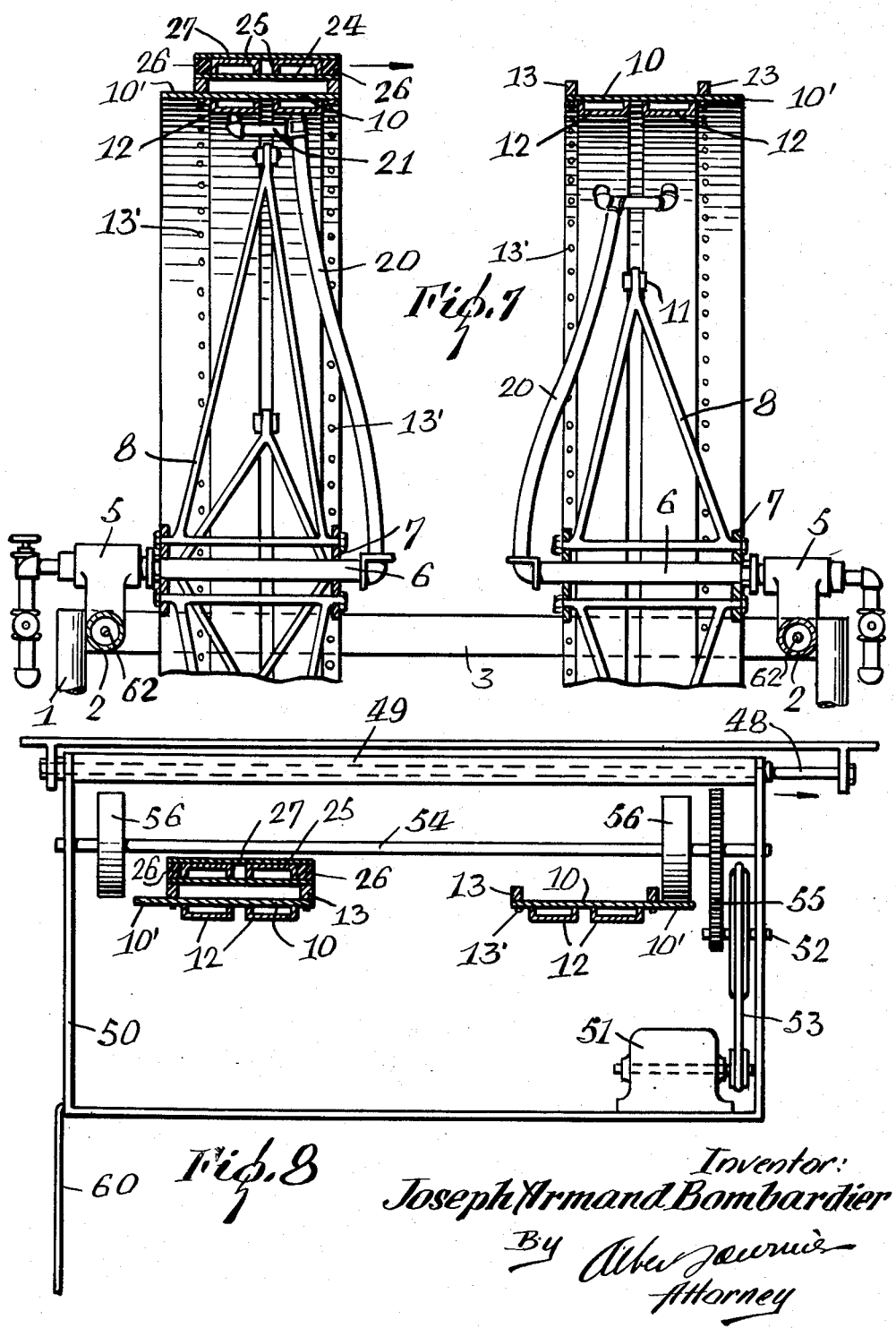
Inventor:
Joseph Armand Bombardier
By Albert Jourdain
   Attorney Patented Nov. 17, 1953

2,659,101

UNITED STATES PATENT OFFICE 2,659,101

VULCANIZING APPARATUS

Joseph Armand Bombardier, Valcourt, Quebec, Canada

Application May 19, 1952, Serial No. 288,669

7 Claims. (Cl. 18—6)

The present invention pertains to a novel vulcanizing apparatus for the manufacture of endless belts such as those used for track vehicles, although not necessarily limited thereto.

Heretofore it has been customary to manufacture such articles in flat lengths and to join the ends to form endless members. The joint is usually weaker than the body of the member and is a frequent source of trouble under heavy loads, in addition to the fact that it requires an additional and expensive operation.

The principal object of the invention is to provide an apparatus for making such endless members without joints. These members are frequently made of rubber and require vulcanizing, and in this connection another object of the invention is to provide suitable means for vulcanizing both surfaces.

A further object of the invention is to provide an apparatus suitable for continuous operation in the sense that it permits assembly or fabrication of one of the belts while another belt is being vulcanized.

A still further object of the invention is to provide a mechanism of relatively simple and inexpensive construction for the purposes set forth and of such character as to permit one operator to assemble a belt while another is being vulcanized.

In the accomplishment of these objects, the apparatus comprises a pair of similar wheel-like units rotatable about a common axis but separate from each other. Each such unit comprises a rim on which the belt material is wound and an inner steam jacket for vulcanizing the inner surface of the belt. A clutch mechanism is provided for electrically rotating the units as the material is wound separately on them.

The outer surface of the belt is vulcanized by an outer jacket common to both units and movable from one to the other. While the outer jacket is positioned over a belt assembled on one of the units, another belt may be assembled on the undercovered unit during the vulcanizing operation at the first unit. When the second belt has been assembled and the vulcanizing of the first belt completed, the outer jacket is shifted to the second unit. The vulcanized belt is then removed from its unit and another belt assembled thereon.

The invention also includes hydraulic mechanism for contracting firmly the outer jacket for curing and means for expanding the outer jacket for removal from a unit prior to transfer to the other unit, means for contracting inside unit for removal of a vulcanized belt therefrom, and mechanical means for shifting the outer jacket from unit to unit.

The invention is fully disclosed by way of example in the following description and in the accompanying drawings in which:

Figure 3 is a fragmentary side elevation;

Figure 4 is a detail plan view;

Figure 5 is a detail front elevation showing the arm for reducing the diameter of the inside steam jacket;

Figure 6 is a plan view therof;

Figure 7 is a section on the line 7—7 of Figure 1, and

Figure 8 is a plan section.

Reference to these views will now be made by use of like characters which are employed to designate corresponding parts throughout.

The frame structure of the machine includes four posts 1 arranged at the corners of a rectangle. The upper ends of the posts are joined by a pair of parallel tubes 2 and a pair of parallel channel irons 3. The lower ends are joined by angle irons 4, as shown in Figure 1.

Figure 2:
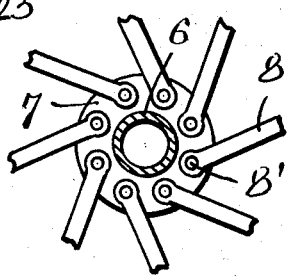
Figure 2 is a detail thereof, partly in section.

At the midpoint of each of the tubes 2 is mounted a bearing 5 in which is supported a tubular axle 6, as shown in Figure 7. The members 6 are alined but separated from each other. Each such axle carries a pair of discs or hubs 7 between which is mounted a series of spokes 8 articulated at 8' as shown in Figure 2.

The outer ends of the spokes are pivotally attached to an outer ring or rim 10 at ears 11. On the inner surface of the ring 10 is attached a pair of circular conduits 12. On the outer surface of the ring is secured a pair of spaced rings 13 of square cross section by bolts 13'. The rim assembly is cut obliquely at 14 (Figures 5 and 6), and the severed ends are closed inasmuch as the conduits constitute a steam jacket as will presently be shown. The severed ends are articulated to a plate 15 to which is secured one end of a lever 16. Here the severed ends of one of the spokes 8a (Figure 1) is not secured directly to the rim 10 but rather through the medium of a short link 17 which is integral with a lever 18.

Figure 1:
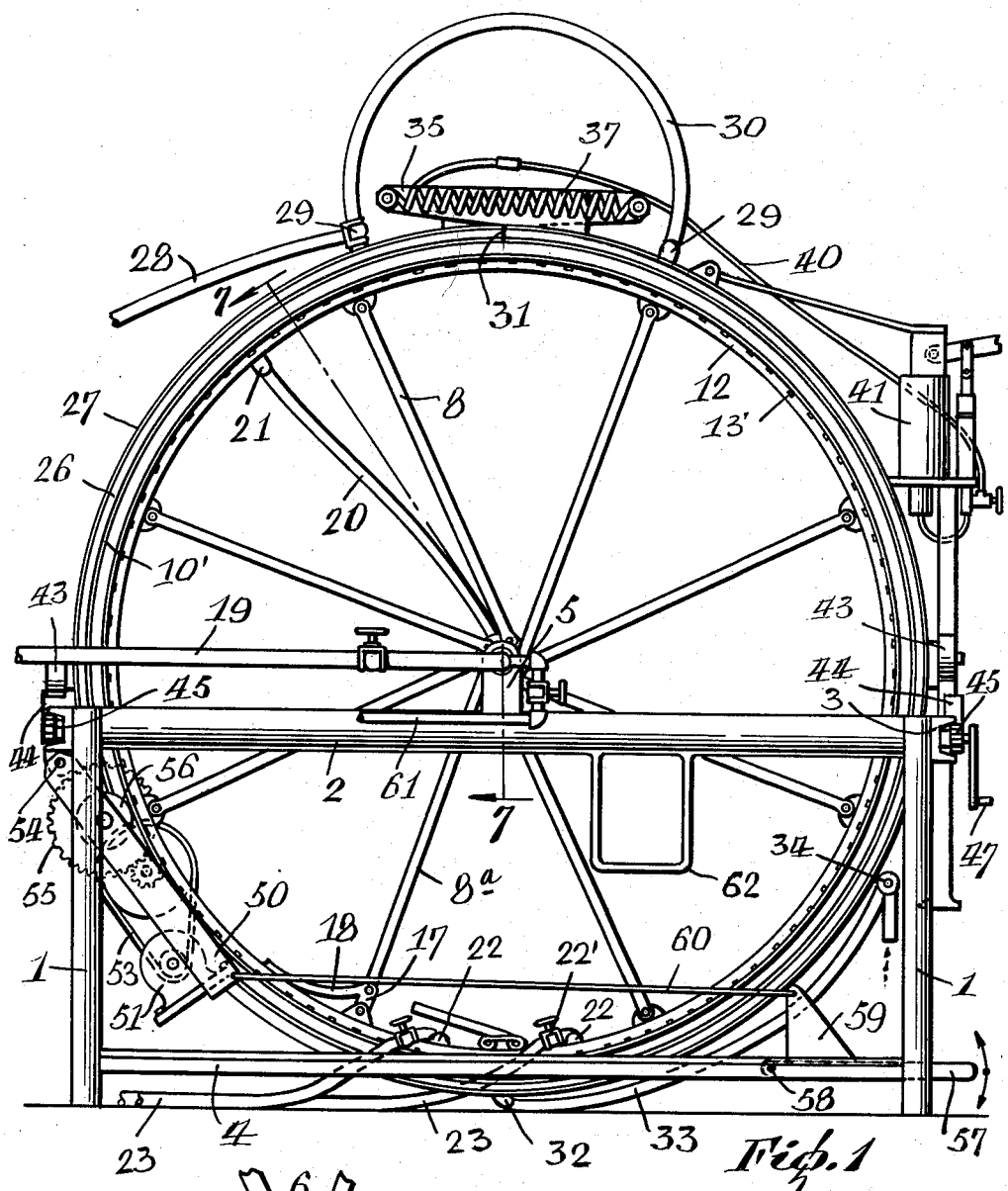
Figure 1 is a front elevation of the device.

Steam for each of the circular units is supplied from a pipe 19 (Figure 1) leading to the tubular axle 6 and thence through a flexible hose 20 and a U-tube 21 to the conduits 12 at a point substantially opposite the split 14, as may be seen in Figure 1. At each side of the split is another U-tube 22 connected to the conduits 12 and leading to a valve 22' from which extends pipes 23.

A jacket is formed outward one of the rims 10 by an unsecured ring 24 bridging the smaller rings 13 and a pair of spaced conduits 25 secured on the member 24. This assembly is completed by a pair of filler rings 26 along the outer walls of the conduits 25 and an outer covering ring 27 that bridges the ring 26 over the conduits 25.

Steam is admitted to the outer conduits 25 by a pipe 28 (Figure 1) and a pair of U-tubes 29 joined together by a hose 30. The outer jacket is split and closed at 31 between the members 29, and steam is delivered to both sides of the division. At the bottom of each wheel unit, or near the split 14, another U-pipe 32 (Figure 1) joins the conduits 25. A pipe 33 connects the member 32 to an exhaust valve 34 for the condensation.

At the opposite sides of the split 31, the ends of the jacket structure are provided with fins (Figure 4), those on one side overlapping those on the other side. Through each set of fins is passed a bolt 36, and the ends of opposed bolts are joined by coil springs 37. Said springs 37 serves to open the jacket when hydraulic pressure is removed.

One of the bolts 36 has a pair of cylinders 38 extending laterally therefrom, and the opposite bolt carries pistons 39 working in the cylinders. A branched pipe 40 supplies hydraulic fluid to the cylinders in order to move the pistons and thus close the structure at the division 31. A hydraulic pump 41 (Figure 1) for supplying the pipe 40 is mounted on the outside jacket structure.

Only one of the circular units has an outside jacket assembly as shown in Figure 7. This assembly is to be switched from one unit to the other, and for this purpose the assembly carries at each side a cross bar 42 with rollers 43 at the ends thereof as shown in Figure 3. The rollers are slightly above the channels 3 and are adapted to engage the channels when the assembly is opened at 31. The bar 42 is joined at each side by a block 44 to an endless chain 45 mounted on sprocket wheels 46 supported by the member 3. Sprocket wheels 46, at opposite sides, are joined by shafts 62 mounted in center of tubes 2. The chain is actuated by a crank 47 on one of the sprockets. For automatically turning either inside jacket assembly while the belt or track is being made, a horizontal rod 48 is mounted on a side of the machine as shown in Figures 1 and 8. The rod receives a sliding tube 49 from which is suspended a U-shaped frame 50. On the frame is mounted a motor 51 connected to a shaft 52 on the frame by a suitable drive 53. A shaft 54 is mounted in the side of the frame and is driven from the shaft 52 by gearing 55. The shaft 54 carries pulleys 56 near the ends and spaced apart slightly farther than the outward projecting edges 10' of the respective rims 10. Consequently only one rim at a time can be engaged by the pulleys, and the selection is made by sliding the tube 49 and suspended structure on the rod 48. This clutch assembly is adjusted by the operator from a pedal 57 (Figure 1) pivoted at 58 to one of the lower members 4 and carrying a lug 59 joined by a link 60 to the bottom of the frame 50. Link 60 is flexible and loosely attached so the pedal 57 need not slide with frame 50. A valved pipe 61 (Figure 1) extends from each tube 6 for removal of condensation or injection of cold water if desired.

In the use of the device, an endless belt is formed on the uncovered rim 10 between the rings 13. Such a belt may be used on a track vehicle or for other purposes. It may consist, for example, of a layer of natural or synthetic rubber, strands of wire and cord, and finally another layer of rubber. When the belt has been built in this manner the outer jacket 24—27 is moved over it by the shifting mechanism shown in Figure 3, compressed firmly by hydraulic cylinders and steam is fed into both jackets for vulcanizing. In the time required for vulcanizing, another belt is built on the other rim 10. The unit is turned by the gearing and selective clutch shown in Figure 8 during the building of the belt so that the material may be wound on the unit.

The outer jacket is tight on the belt being vulcanized and therefore cannot easily be removed from the belt. Prior to shifting, therefore, the outer jacket is expanded at the split 31 by action of springs 37 while pressure of the pistons 39 in the cylinders 38, shown in Figure 4 is released by a by-pass controlling the fluid of the pump 41 in hydraulic system. On expansion of the jacket 24—27, the rollers 43 come into contact with the rails 3.

Also, the vulcanized belt is tight on the ring 10 and cannot be stretched over the rings 13 by human force. Instead, the ring assembly and inner jacket are contracted at the split 14 by use of the lever 16, after which the belt can easily be moved off.

As shown in Figure 7, the axles 6 are spaced apart so that the operator can remove the finished endless belt from the machine. While winding the material, he stands in a convenient position outward of the unit on which he is working. From each member 2 is suspended a stirrup 62 (Figure 1) on which the operator may stand in order to look at the top of the machine if necessary.

Although a specific embodiment of the invention has been illustrated and described, it will be understood that various alterations in the details of construction may be made without departing from the scope of the invention as indicated by the appended claims.

What I claim is:

1. A vulcanizing apparatus comprising a pair of wheel-like units on a common axis, each unit including a rim and a steam jacket within the rim, an outer jacket concentric with said rims, and means for moving the outer jacket from one rim to the other.

2. A vulcanizing apparatus comprising a pair of wheel-like units on a common axis, each unit including a rim and a steam jacket within the rim, an outer jacket concentric with said rims, the inner jackets and rims being split transversely and sealed at the split, means for contracting the inner jackets at the split, means for contracting the outer jacket, and means for moving the outer jacket from one rim to the other.

3. A vulcanizing apparatus comprising a pair of wheel-like units on a common axis, each unit including a rim and a steam jacket within the rim, an outer jacket concentric with said rims, the outer jacket being split transversely and sealed at the split, means for contracting and expanding the outer jacket, and means for moving the outer jacket from one rim to the other.

4. A vulcanizing apparatus comprising a pair of wheel-like units on a common axis, each unit including a rim and a steam jacket within the rim, an outer jacket concentric with said rims, the inner jackets and rims and the outer jacket being split transversely and sealed at the split, means for contracting the inner jackets at the split, means for contracting and expanding the outer jacket at the split, and means for moving the outer jacket from one rim to the other.

5. A vulcanizing apparatus as set forth in claim 1, further characterized by means for selectively rotating said units.

6. A vulcanizing apparatus comprising a pair of wheel-like units on a common axis, each unit including a rim and a steam jacket within the rim, an outer jacket concentric with said rims, a frame supporting said units and including a track, rollers carried by said outer jacket and adapted to engage said track, and means for propelling said outer jacket on said track from rim to rim.

7. A vulcanizing apparatus comprising a pair of wheel-like units on a common axis, each unit including a rim and a steam jacket within the rim, an outer jacket concentric with said rims, the outer jacket being split transversely and sealed at the split, a frame supporting said units and including a track, rollers carried by said outer jacket and adapted to engage said track on expansion of the outer jacket, and means for propelling said outer jacket on said track from rim to rim.

JOSEPH ARMAND BOMBARDIER.

References Cited in the file of this patent

UNITED STATES PATENTS

| Number | Name | Date |
|---|---|---|
| 1,404,217 | Murray | Jan. 24, 1922 |
| 1,611,884 | Campbell | Dec. 28, 1926 |
| 1,995,892 | Manning | Mar. 26, 1935 |

FOREIGN PATENTS

| Number | Country | Date |
|---|---|---|
| 268,732 | Great Britain | July 14, 1927 |